US012589759B2

(12) United States Patent (10) Patent No.: US 12,589,759 B2

Rostiti et al. (45) Date of Patent: Mar. 31, 2026

(54) ITERATIVE TUNING TECHNIQUES FOR VEHICLE FEEDBACK BASED SYSTEMS WITH TIME DELAYS

(71) Applicant: FCA US LLC, Auburn Hills, MI (US)

(72) Inventors: Cristian Rostiti, Troy, MI (US); Nadirsh D Patel, Farmington Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 297 days.

(21) Appl. No.: 18/356,279

(22) Filed: Jul. 21, 2023

(65) Prior Publication Data

US 2025/0026360 A1 Jan. 23, 2025

(51) Int. Cl.
*B60W 50/06* (2006.01)
*B60W 50/02* (2012.01)

(52) U.S. Cl.
CPC ........ *B60W 50/06* (2013.01); *B60W 50/0205* (2013.01); *B60W 2510/0642* (2013.01); *B60W 2510/081* (2013.01); *B60W 2510/083* (2013.01); *B60W 2510/22* (2013.01)

(58) Field of Classification Search
CPC ............. B60W 50/06; B60W 50/0205; B60W 2510/0642; B60W 2510/081; B60W 2510/083; B60W 2510/22
USPC ......................................................... 701/33.1
See application file for complete search history.

(56) References Cited

U.S. PATENT DOCUMENTS

| | | | |
|---|---|---|---|
| 5,231,583 A * | 7/1993 | Lizell | B60G 17/015 |
| | | | 280/5.506 |
| 7,216,006 B2 | 5/2007 | Yasui et al. | |
| 7,357,204 B2 | 4/2008 | Hisada et al. | |
| 7,536,992 B1 | 5/2009 | Wieshuber et al. | |
| 7,759,885 B2 | 7/2010 | Yamada et al. | |
| 9,067,601 B2 | 6/2015 | Itabashi et al. | |
| 9,720,387 B2 | 8/2017 | Gao | |
| 11,565,703 B1 * | 1/2023 | Kiwan | F02D 41/0235 |
| 2011/0071729 A1 * | 3/2011 | Oblizajek | B62D 5/0472 |
| | | | 701/41 |

(Continued)

OTHER PUBLICATIONS

Onat, C., "A New Concept on PI Design for Time Delay Systems: Weighted Geometrical Center", Department of Mechanical Engineering, International Journal of Innovative Computing Information and Control, vol. 9, No. 4, p. 1539-1556 (Apr. 2013).

(Continued)

*Primary Examiner* — Isaac G Smith

(74) *Attorney, Agent, or Firm* — Jeremy J. Klobucar

(57) ABSTRACT

An iterative tuning technique for a controller of a vehicle having a feedback based system includes obtaining, by a calibration system, a simulation model of operation of the controller and the feedback based system with a set of time delays, performing an iterative tuning process by running the simulation model to determine an optimal set of gains for the feedback based system for each of one or more sets of time delays and evaluating a cost function, and based on the cost function evaluating, determining the optimal set of gains for the feedback based system for the set of time delays, and uploading, by the calibration system to the controller, the one or more optimal sets of gains for the feedback based system for the one or more sets of time delays, respectively.

18 Claims, 5 Drawing Sheets

(56) References Cited

U.S. PATENT DOCUMENTS

2018/0067086 A1 * 3/2018 Tian ................... G01N 29/4454
2022/0097728 A1 * 3/2022 Lin ........................ G06N 20/00

OTHER PUBLICATIONS

Ruscio, David Di, "On Tuning PI Controllers for Integrating Plus Time Delay Systems", Modeling, Identification and Control, vol. 31, No. 4, p. 145-164 (2010).

* cited by examiner

ITERATIVE TUNING TECHNIQUES FOR VEHICLE FEEDBACK BASED SYSTEMS WITH TIME DELAYS

FIELD

The present application generally relates to a system controlled using a feedback-based algorithm generally applied to an automotive apparatus and, more particularly, to techniques for iterative tuning of these feedback-based algorithms used to control automotive apparatuses.

BACKGROUND

Vehicles often include one or more systems that are controlled based on feedback. This feedback based control generally involves controlling a device having moving/rotating component(s) based on a target control value and then adjusting its control based on a measured response and a feedback control scheme (proportional-integral (PI), proportional-integral-derivative (PID), etc.). In some cases, these feedback based systems are also affected by time delays. These time delays reduce feedback based system control performance and could even make the system unstable. Designing feedback based controllers, including specific gain values, is therefore a difficult task. Conventional solutions either ignore these time delays (sub-optimal performance) or use very simple (e.g., first-order) systems or approximations, which are not representative of a practical engineering problem. Accordingly, while such conventional vehicle feedback based systems do work for their intended purpose, there exists an opportunity for improvement in the relevant art.

SUMMARY

According to one example aspect of the invention, an iterative tuning system for a controller of a vehicle having a feedback based system is presented. In one exemplary implementation, the iterative tuning system comprises a communication interface configured to connect to the controller and a calibration system configured to connect to the controller via the communication interface and to calibrate the controller by obtaining a simulation model of operation of the controller and the feedback based system with a set of time delays, performing an iterative tuning process to determine an optimal set of gains for the feedback based system for each of one or more sets of time delays, the iterative tuning process including determining a particular set of time delays from the one or more sets of time delays, running the simulation model with a particular set of gains for the feedback based system and evaluating a cost function, and based on the cost function evaluating, determining the optimal set of gains for the feedback based system for the set of time delays, and uploading, to the controller via the communication interface, the one or more optimal sets of gains for the feedback based system for the one or more sets of time delays, respectively.

In some implementations, the cost function considers an accumulation of tracking error as the feedback based system is accelerated to a target value. In some implementations, the feedback based system is a speed of an electric motor of the vehicle, the electric motor having actual and reference angular velocities $\omega_{act}$ and $\omega_{ref}$, and wherein the cost function ($J_c$) is defined as follows:

$$J_c = \alpha \int_{t=0}^{T_t} (\omega_{act} - \omega_{ref})^2 +$$

$$(1-\alpha) \int_{t=T_t}^{T_{end}} (\omega_{act} - \omega_{ref})^2 + \beta \int_{t=0}^{T_{end}} \begin{cases} 0, & |T_{act}| < T_{act}^{lim} \\ (T_{act} - T_{act}^{lim})^2, & |T_{act}| \geq T_{act}^{lim} \end{cases},$$

where $T_t$ is a raise time, $\alpha$ is a split between error before the raise time and a steady-state error, $\beta$ is a weight of a control action, and $T_{act}^{lim}$ is a threshold used to penalize the control action.

In some implementations, the set of time delays includes at least one of a sampling rate of the controller and a communication delay via a controller area network (CAN) on which the controller is connected. In some implementations, the set of time delays further includes at least one of controller software scheduling delays and vehicle actuator actuation delays. In some implementations, the set of time delays further includes at least one of a friction delay and an inertia delay for a moving component of the feedback based system. In some implementations, the feedback based system is controlled by the controller using a proportional-integral (PI) or proportional-integral-derivative (PID) feedback scheme, and wherein the set of gains includes at least one of a proportional gain and an integral gain. In some implementations, the feedback based system is a speed or torque of an electric motor of the vehicle. In some implementations, the feedback based system is an idle speed of an internal combustion engine of the vehicle. In some implementations, the feedback based system is a position of an active suspension system of the vehicle.

According to another example aspect of the invention, an iterative tuning method for a controller of a vehicle having a feedback based system is presented. In one exemplary implementation, the iterative tuning method comprises obtaining, by a calibration system configured to communicate with the controller via a communication interface, a simulation model of operation of the controller and the feedback based system with a set of time delays, performing, by the calibration system, an iterative tuning process to determine an optimal set of gains for the feedback based system for each of one or more sets of time delays, the iterative tuning process including determining a particular set of time delays from the one or more sets of time delays, running the simulation model with a particular set of gains for the feedback based system and evaluating a cost function, and based on the cost function evaluating, determining the optimal set of gains for the feedback based system for the set of time delays, and uploading, by the calibration system to the controller via the communication interface, the one or more optimal sets of gains for the feedback based system for the one or more sets of time delays, respectively.

In some implementations, the cost function considers an accumulation of tracking error as the feedback based system is accelerated to a target value. In some implementations, feedback based system is a speed of an electric motor of the vehicle, the electric motor having actual and reference angular velocities $\omega_{act}$ and $\omega_{ref}$, and wherein the cost function ($J_c$) is defined as follows:

$$J_c = \alpha \int_{t=0}^{T_t} (\omega_{act} - \omega_{ref})^2 +$$

-continued $$(1-\alpha)\int_{t=T_t}^{T_{end}}(\omega_{act}-\omega_{ref})^2 + \beta\int_{t=0}^{T_{end}}\begin{cases}0, & |T_{act}| < T_{act}^{lim}\\ (T_{act}-T_{act}^{lim})^2, & |T_{act}| \geq T_{act}^{lim}\end{cases},$$

where $T_r$ is a raise time, $\alpha$ is a split between error before the raise time and a steady-state error, $\beta$ is a weight of a control action, and $T_{act}{}^{lim}$ is a threshold used to penalize the control action.

In some implementations, the set of time delays includes at least one of a sampling rate of the controller and a communication delay via a CAN on which the controller is connected. In some implementations, the set of time delays further includes at least one of controller software scheduling delays and vehicle actuator actuation delays. In some implementations, the set of time delays further includes at least one of a friction delay and an inertia delay for a moving component of the feedback based system. In some implementations, the feedback based system is controlled by the controller using a PI or PID feedback scheme, and wherein the set of gains includes at least one of a proportional gain and an integral gain. In some implementations, the feedback based system is a speed or torque of an electric motor of the vehicle. In some implementations, the feedback based system is an idle speed of an internal combustion engine of the vehicle. In some implementations, the feedback based system is a position of an active suspension system of the vehicle.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

As previously discussed, a vehicle feedback based system could be affected by time delays. These time delays reduce feedback based system control performance and could even make the system unstable. Designing feedback based controllers (proportional-integral (PI), proportional-integral-derivative (PID), etc.), including specific gain values, is therefore a difficult task. Conventional solutions to this problem either (i) ignore these time delays, which could result in sub-optimal performance, or (ii) use very simple (e.g., first-order) systems or approximations, which are not representative of a practical engineering problem. For example, a conventional weighted geometric approach requires determining an analytic transfer function of the system, but this is obtained by approximation. Accordingly, iterative tuning procedures and methods for vehicle feedback-based control algorithms with time delays are presented herein. Non-limiting examples of the vehicle system problems that can be controlled using feedback-based algorithms include an electric motor speed/torque, an engine idle speed, and an active suspension position. Non-limiting examples of the time delays include communication/controller area network (CAN) delays, controller sampling rate, sensor/actuator delays, and actuation dynamics/friction.

The iterative tuning techniques are executed or performed by a calibration system that is separate from the vehicle's controller and in a plant (e.g., assembly) environment. The calibration system performs an iterative tuning process to identify final gain values (P-gain, I-gain, etc.) for the controller's feedback control scheme (PI, PID, etc.). The gain values are initially set to reasonable baseline values at a start of the iterative tuning process. A modeled simulation environment, which could be generated using any suitable mathematical modeling software (e.g., Simulink® MATLAB®), is run using the parameters from the previous step, with a cost function based on key performance indicators (KPI) being evaluated at an end of each step to consider accumulation of tracking error. Once a termination condition (e.g., a tolerance on an optimization variable or a cost function value) is satisfied, the optimal gain value(s) are identified and the iterative tuning ends. The vehicle controller is then calibrated using the calibration system's identified gain values, and the calibrated controller is then utilized on a production vehicle for improved control the feedback based system, which could result in increased performance/efficiency.

Figure 1A:
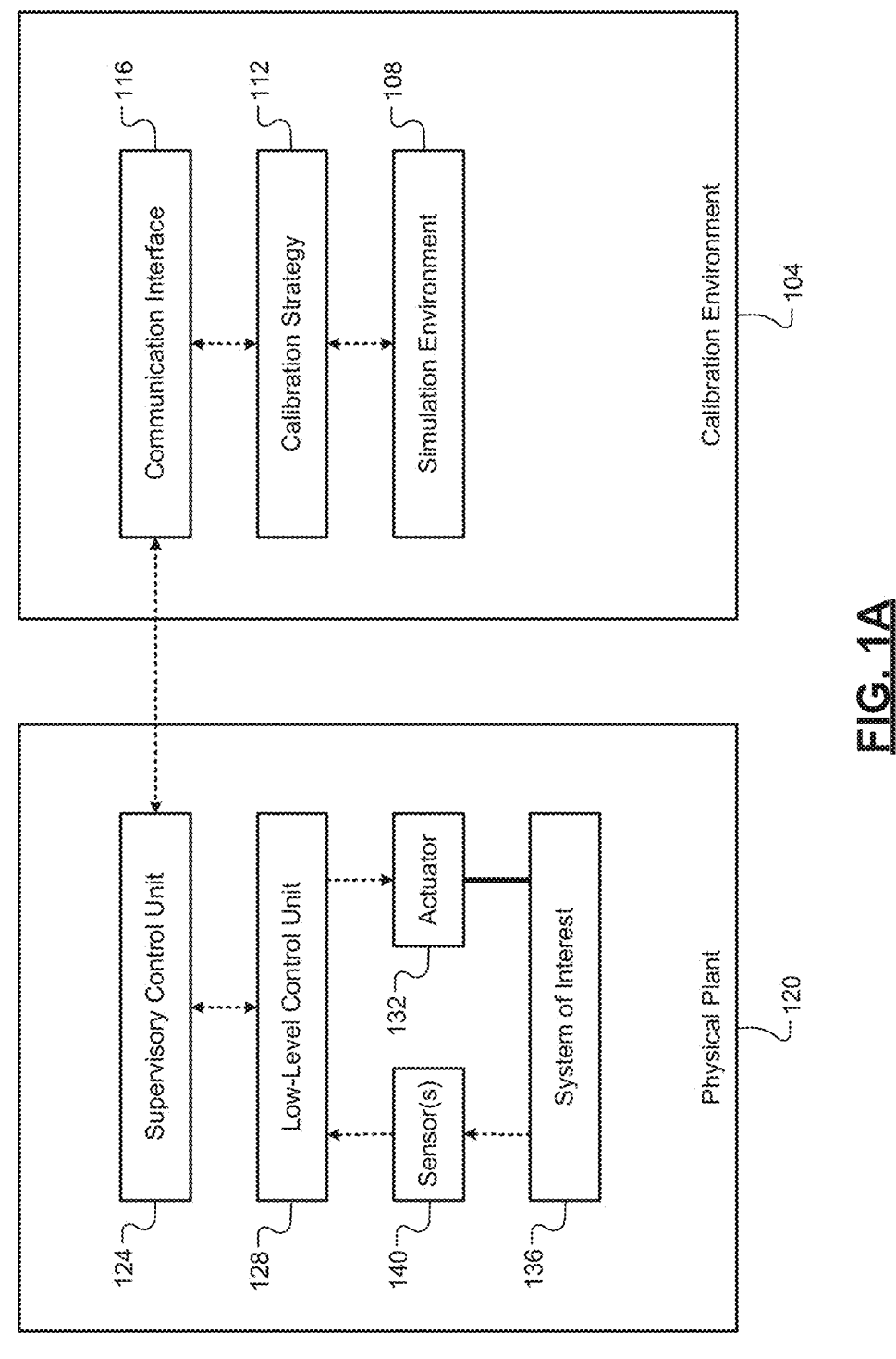
FIGS. 1A-1B are functional block diagrams of an example generic plant system and an example vehicle with an electric motor with possible delays that are controlled using feedback-based algorithms that can be tuned by a calibration environment using an iterative tuning technique according to the principles of the present application.
Figure 1B:
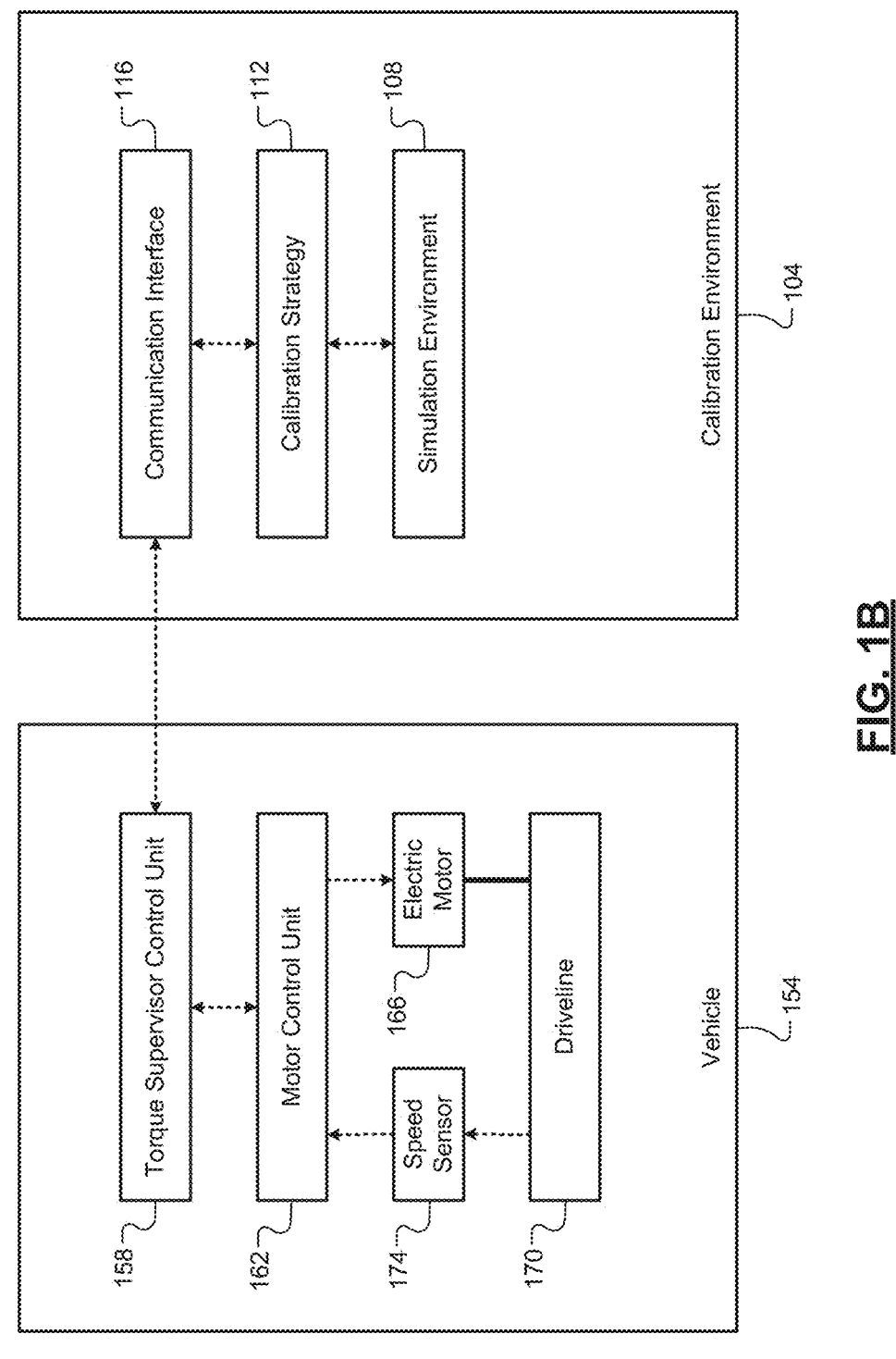

Referring now to FIGS. 1A-1B, functional block diagrams of example systems 100, 150 according to the principles of the present application are illustrated. In both systems 100, 150, a calibration environment 104 includes a simulation environment 108, a calibration strategy 112, and a communication interface 116. The calibration environment 104 is configured to simulate operation of a system (e.g., a generic plant system 120) having a feedback-based control algorithm and to iteratively tune calibrations (e.g., gain values) of the feedback-based control algorithm, which could then be uploaded, via the communication interface 116, to the plant system 120 for storage and subsequent usage. The plant system 120 is generic in that it includes a supervisory controller or control unit 124 that oversees a low-level control unit 128 for a feedback-controlled system including a system of interest 136 actuated by an actuator 132 and controlled using a feedback-based algorithm based on measurement from one or more sensors 140. As can be seen, possible scheduling delays and communication (network) delays exist throughout the plant system 120. FIG. 1B illustrates a more specific system with an example vehicle 154 for the more generic plant system 120. As shown the vehicle 154 includes a torque supervisor control unit 158, a motor control unit 162, an electric motor 166, a driveline 170, and a speed sensor 174. Electric motor speed is merely one example and it will be appreciated that other feedback-controlled systems could be simulated and calibrated (motor torque, engine idle speed, active suspension position, etc.).

Figure 2:
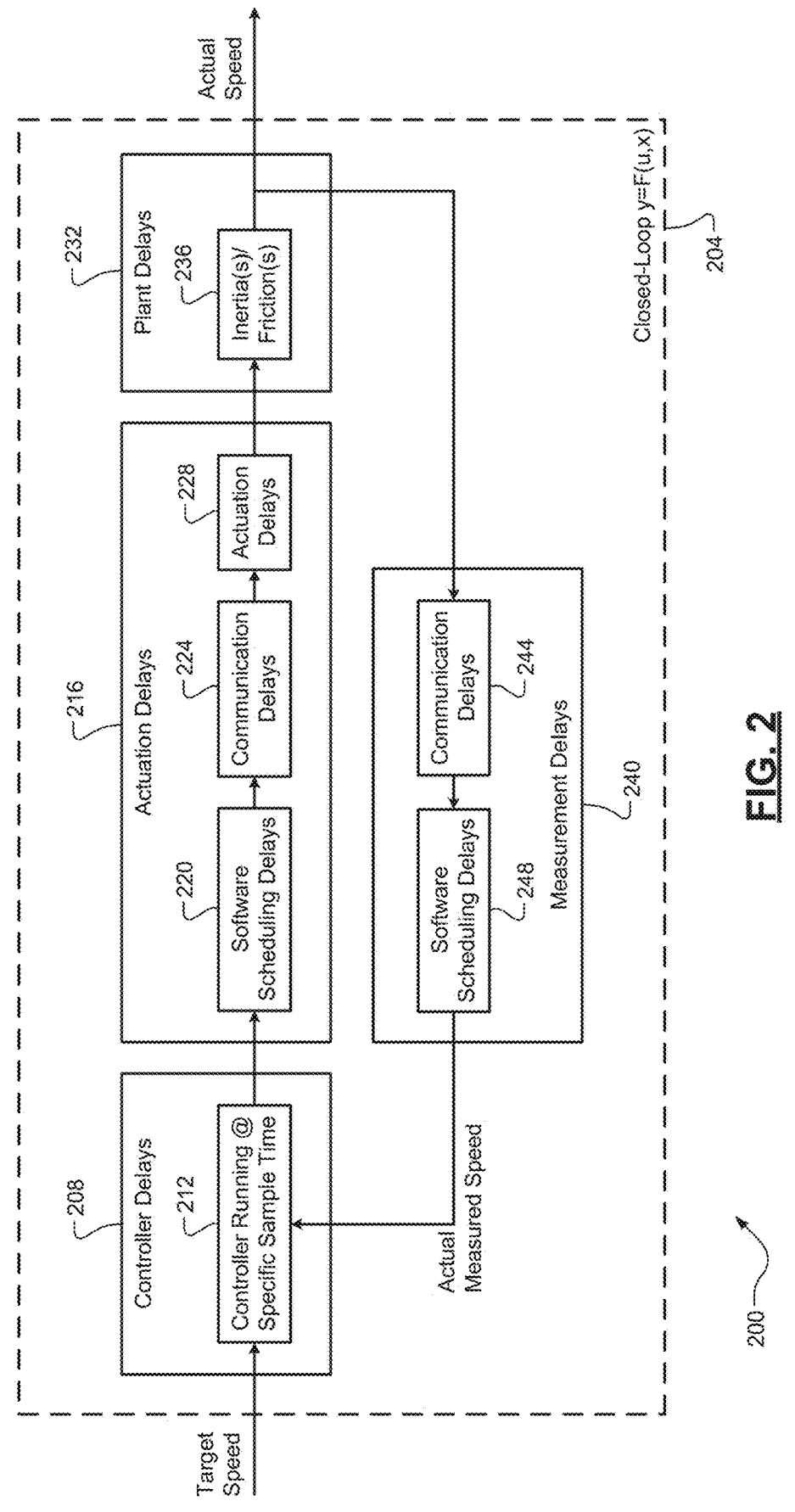
FIG. 2 is a functional block diagram of an example system with possible delays that is controlled using a feedback-based algorithm that can be tuned using the iterative tuning technique according to the principles of the present application.

Referring now to FIG. 2 and with continued reference to FIG. 1, a functional block diagram of an example architecture for a simulation model 200 (or "model 200") representing the simulation environment that will be used in the iterative tuning technique according to the principles of the present application is illustrated. The iterative tuning technique of the present application surrounds the unique approach to parameter generation of a feedback scheme-based controller (PI, PID, etc.). In this description, specific reference will be made to speed/torque control of an electric motor of a vehicle, but it will be appreciated that the iterative tuning technique of the present application is applicable to any suitable closed-loop system. Given that the focus of this technique is on analyzing the effects of sampling and delays, the plant model only captures the fundamental elements of the system in order to maintain a manageable simulation environment. The plant dynamics can be generally described as follows:

$$J_{eq}\frac{d\omega_{act}}{dt} = T_{act} - T_{fric}, \tag{1}$$

where $J_{eq}$ represents the equivalent inertia at the actuator side (electric motor), $\omega_{act}$ is the angular velocity, $T_{act}$ and $T_{fric}$ are the actuator and friction torque, respectively.

A simple model to compute the frictions is used which lump all sources of resistance into one term function of the angular velocity:

$$T_{fric} = f(\omega_{act}), \tag{2}$$

where $f(\omega_{act})$ is a complex, non-linear relationship function of the angular velocity. The main requirement is to be able to model the system under study in a mathematical way so that its behavior can be simulated. This can be done, for example, using a mathematical modeling software, such as Simulink® MATLAB®. The model will include all major aspects of the system, such as sampling rate of the controller, measurement and actuation delays, actuation dynamics, friction, etc. This technique for calibrating the controller parameters, namely the proportional and integral gain (P-gain and I-gain), works in an iterative loop. In the model 200, a target speed (for an electric motor example) is provided as an input to a closed-loop (e.g., y=F(u,x)) feedback loop 204. A controller delays block 208 includes a delay block 212 associated with the controller (e.g., torque supervisor control unit 124) running at a specific sampling rate.

An actuation delays block 216 includes three delay blocks 220-228: a software scheduling delays block 220, a communication delays block 224, and an actuation delays block 228. The software scheduling delays 220 represents a delay that the executing software includes, the communication delays 224 represents network/communication delays (e.g., on the CAN 178), and the actuation delays 228 represents a delay of the particular actuator(s) (e.g., a moving component of the electric motor). A plant system dynamic block 232 includes a physical-based dynamic block 236 associated with inertia(s) and/or friction(s) associated component(s) of the electric motor (e.g., measured/observed in the plant environment). After all of these delays, the actual speed (i.e., as observed/measured), including the total delay, is simulated. There are also sensor delays 240, however, including two delay blocks: a communication delays block 244 and a software scheduling delays 248. Similar to above, the software scheduling delays 248 represents a delay that the executing software includes and the communication delays 244 represents network/communication delays (e.g., on the CAN 178). After accounting for this additional delay, the actual measured speed is simulated and fed back to the controller (the controller delays block 208) as part of the closed-loop feedback.

Figure 3:
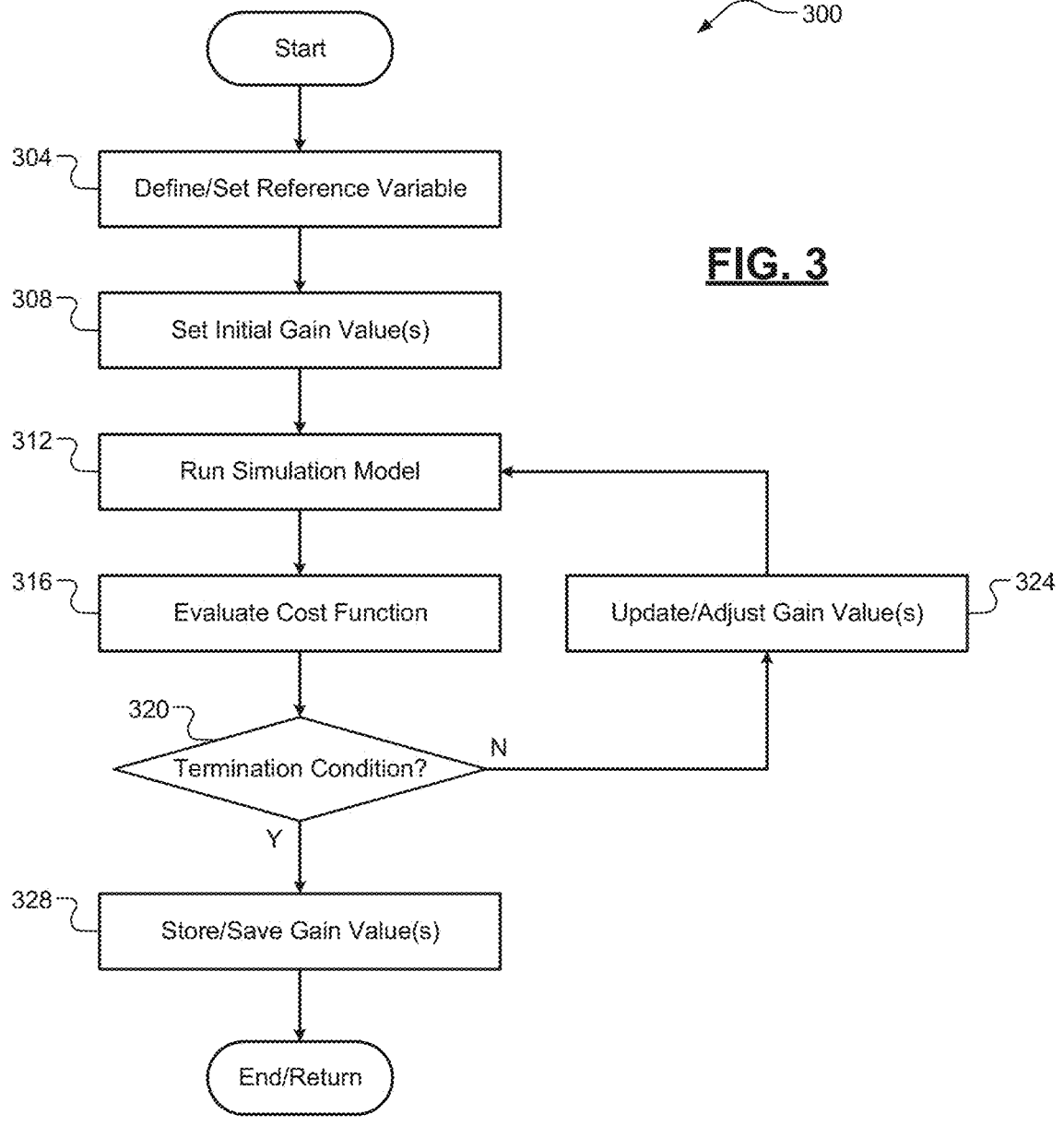
FIG. 3 is a flow diagram of an example iterative tuning method for a controller of a vehicle having a feedback based system with time delays according to the principles of the present application.

Referring now to FIG. 3 and with continued reference to FIGS. 1-2, a flow diagram of an example iterative tuning method 300 according to the principles of the present application is illustrated. It starts by defining a specific input parameter (e.g., electric motor speed) reference that we want to track at 304. This will represent the specific working condition we want the system to perform. Note that this approach can be repeated with some or all speed reference we expect the system to be excited with. The algorithm then recursively runs the simulation environment using the defined speed reference profile and a set of (e.g., PI/PID) gains. Initially these gains are set to reasonable base/default values at 308. The simulation environment is then run at 312 using the parameters from the previous step. A cost function is then evaluated at 316, which considers the accumulation of the tracking error as the system is rapidly accelerated towards the target, the oscillations, and magnitude of the control action. These represent the key performance indexes (KPI) of choice.

Figure 4:
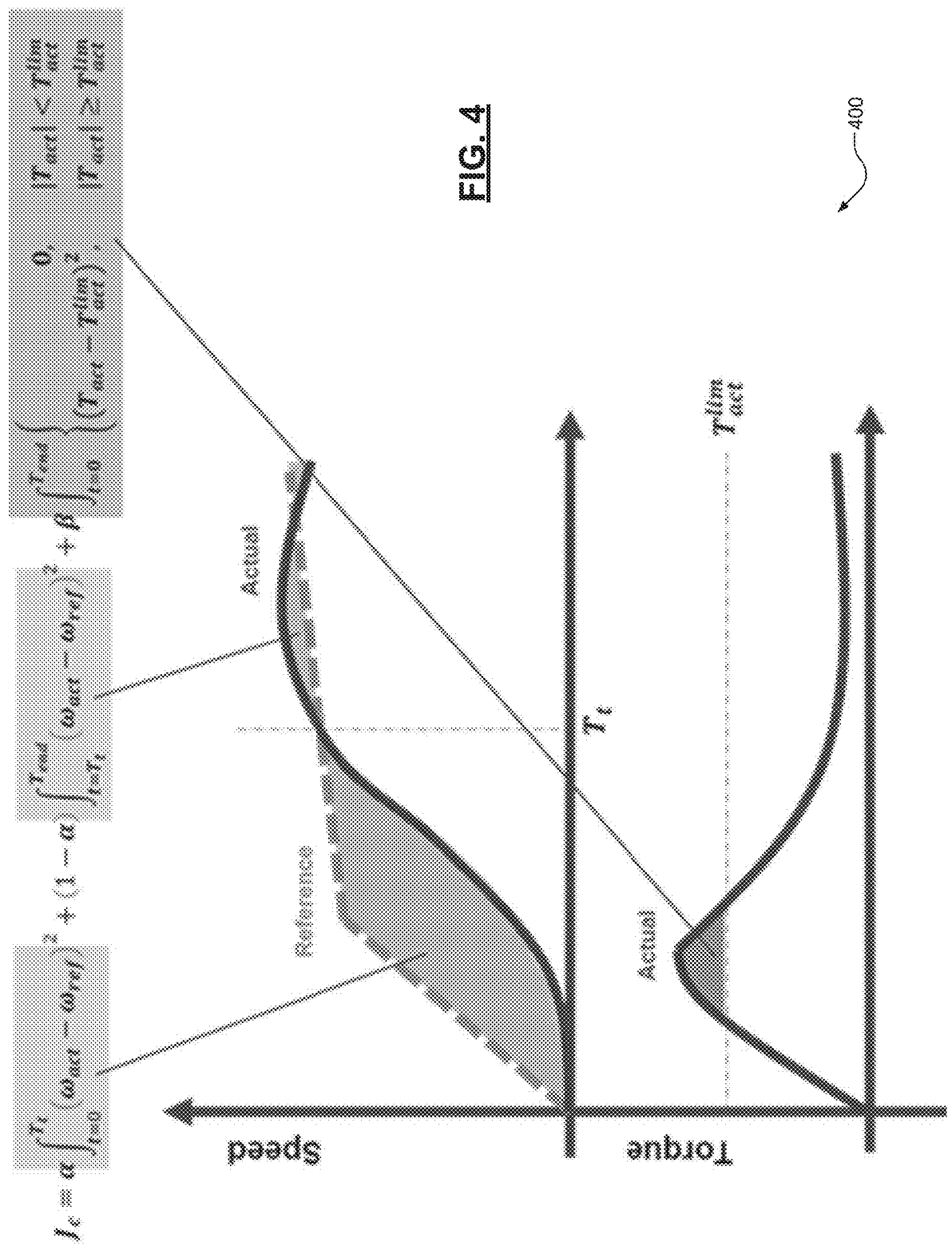
FIG. 4 is a plot of an example and a representative plot of a cost function that can be used to calibrate a feedback-based algorithm with the iterative tuning technique according to the principles of the present application.

In one exemplary implementation, for an electric motor having actual and reference angular velocities $\omega_{act}$ and $\omega_{ref}$, the cost function ($J_c$) is defined as follows:

$$J_c = \alpha \int_{t=0}^{T_t} (\omega_{act} - \omega_{ref})^2 + \tag{3}$$

$$(1-\alpha)\int_{t=T_t}^{T_{end}} (\omega_{act} - \omega_{ref})^2 + \beta \int_{t=0}^{T_{end}} \begin{cases} 0, & |T_{act}| < T_{act}^{lim} \\ (T_{act} - T_{act}^{lim})^2, & |T_{act}| \geq T_{act}^{lim} \end{cases},$$

where $T_t$ is a raise time, $\alpha$ is a split between error before the raise time and a steady-state error, $\beta$ is a weight of a control action, and $T_{act}^{lim}$ is a threshold used to penalize the control action. Mathematically and visually, the cost function is represented as shown in the example plot 400 of FIG. 4. Note that other KPIs can be selected based on the specific needs. The chosen optimization method, for example, using the MATLAB® fminsearch function, will update the calibration parameters and start a new cycle. It recursively runs the simulation environment using the defined speed reference profile and a set of PI gains. Initially these gains $K_p$ and $K_i$ are set to any reasonable (e.g., very low) values and are then updated by fminsearch.

The cost function (3) is then evaluated until the termination tolerances of both the optimization variable and cost function are reached, in this case $10^{-7}$ and $10^{-4}$ respectively. In this specific exercise, $\alpha=0.1$, and $\beta=1$ were used as weights for the cost function. Note that the PI calibrations might change for different speed references. For a more robust approach, multiple target traces should be considered. Once a termination condition, such as the tolerance on the optimization variable and/or the value of the cost function, is satisfied at 320, the algorithm stops and the final gain values (e.g., P-gain and I-gain) are stored/saved and eventually uploaded to the controller to complete its calibration. When not satisfied at 320, the method 300 updates/adjusts the gain value(s) at 324 and the method 300 returns to 312 and the iterative tuning process continues until the termination condition is eventually satisfied at 320. Once the calibration is complete (e.g., all of the P-gains and I-gains have been optimized), the calibrated data is finally uploaded to the vehicle 154 (via communication interface 116) and stored (e.g., in non-volatile memory, or NVM) at the torque supervisor control unit 158 for future usage by the vehicle 154 in a post-plant environment.

It will be appreciated that the terms "controller" and "control unit" as used herein refers to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. An iterative tuning system for a controller of a vehicle having a feedback based system, the iterative tuning system comprising:

a calibration system configured to communicate with the controller via a communication interface and to calibrate the controller by:

obtaining a simulation model of operation of the controller and the feedback based system with a set of time delays;

performing an iterative tuning process to determine an optimal set of gains for the feedback based system for each of one or more sets of time delays, the iterative tuning process including:

determining a particular set of time delays from the one or more sets of time delays, running the simulation model with a particular set of gains for the feedback based system and evaluating a cost function, wherein the cost function involves an accumulation of tracking error as the feedback based system is accelerated to a target value, and based on the cost function evaluating, determining the optimal set of gains for the feedback based system for the set of time delays; and uploading, to the controller via the communication interface, the one or more optimal sets of gains for the feedback based system for the one or more sets of time delays, respectively, wherein the feedback based system includes a speed of an electric motor of the vehicle and the cost function is based on actual and reference angular velocities of the electric motor, a raise time, a split between error before the raise time and a steady-state error, a weight of a control action, and a threshold used to penalize the control action; and the controller of the vehicle, wherein the controller is configured control operation of the feedback based system of the vehicle based on the optimal set of gains for the feedback based system for the one or more sets of time delays, respectively, to improve at least one of a performance and an efficiency of the feedback based system and the vehicle.

2. The iterative tuning system of claim 1, wherein the electric motor has actual and reference angular velocities $\omega_{act}$ and $\omega_{ref}$, and wherein the cost function ($J_c$) is defined as follows:

$$J_c = \alpha \int_{t=0}^{T_t} (\omega_{act} - \omega_{ref})^2 +$$

$$(1-\alpha) \int_{t=T_t}^{T_{end}} (\omega_{act} - \omega_{ref})^2 + \beta \int_{t=0}^{T_{end}} \begin{cases} 0, & |T_{act}| < T_{act}^{lim} \\ (T_{act} - T_{act}^{lim})^2, & |T_{act}| \geq T_{act}^{lim} \end{cases},$$

where $T_t$ is the raise time, $\alpha$ is the split between error before the raise time and the steady-state error, $\beta$ is the weight of the control action, and $T_{act}^{lim}$ is the threshold used to penalize the control action.

3. The iterative tuning system of claim 1, wherein the set of time delays includes at least one of a sampling rate of the controller and a communication delay via a controller area network (CAN) on which the controller is connected.

4. The iterative tuning system of claim 3, wherein the set of time delays further includes at least one of controller software scheduling delays and vehicle actuator actuation delays.

5. The iterative tuning system of claim 4, wherein the set of time delays further includes at least one of a friction delay and an inertia delay for a moving component of the feedback based system.

6. The iterative tuning system of claim 1, wherein the feedback based system is controlled by the controller using a proportional-integral (PI) or proportional-integral-derivative (PID) feedback scheme, and wherein the set of gains includes at least one of a proportional gain and an integral gain.

7. The iterative tuning system of claim 1, wherein the feedback based system further includes a torque of the electric motor of the vehicle.

8. The iterative tuning system of claim 1, wherein the feedback based system further includes an idle speed of an internal combustion engine of the vehicle.

9. The iterative tuning system of claim 1, wherein the feedback based system further includes a position of an active suspension system of the vehicle.

10. An iterative tuning method for a controller of a vehicle having a feedback based system, the iterative tuning method comprising:

obtaining, by a calibration system configured to communicate with the controller via a communication interface, a simulation model of operation of the controller and the feedback based system with a set of time delays;

performing, by the calibration system, an iterative tuning process to determine an optimal set of gains for the feedback based system for each of one or more sets of time delays, the iterative tuning process including:

determining a particular set of time delays from the one or more sets of time delays, running the simulation model with a particular set of gains for the feedback based system and evaluating a cost function, wherein the cost function involves an accumulation of tracking error as the feedback based system is accelerated to a target value, and based on the cost function evaluating, determining the optimal set of gains for the feedback based system for the set of time delays;

uploading, by the calibration system to the controller via the communication interface, the one or more optimal sets of gains for the feedback based system for the one or more sets of time delays, respectively, wherein the feedback based system includes a speed of an electric motor of the vehicle and the cost function is based on actual and reference angular velocities of the electric motor, a raise time, a split between error before the raise time and a steady-state error, a weight of a control action, and a threshold used to penalize the control action; and controlling, by the controller, operation of the feedback based system of the vehicle based on the optimal set of gains for the feedback based system for the one or more sets of time delays, respectively, to improve at least one of a performance and an efficiency of the feedback based system and the vehicle.

11. The iterative tuning method of claim 10, wherein the electric motor has actual and reference angular velocities $\omega_{act}$ and $\omega_{ref}$, and wherein the cost function ($J_c$) is defined as follows:

$$J_c = \alpha \int_{t=0}^{T_t} (\omega_{act} - \omega_{ref})^2 +$$

$$(1-\alpha) \int_{t=T_t}^{T_{end}} (\omega_{act} - \omega_{ref})^2 + \beta \int_{t=0}^{T_{end}} \begin{cases} 0, & |T_{act}| < T_{act}^{lim} \\ (T_{act} - T_{act}^{lim})^2, & |T_{act}| \geq T_{act}^{lim} \end{cases},$$

where $T_t$ is the raise time, $\alpha$ is the split between error before the raise time and the steady-state error, $\beta$ is the weight of the control action, and $T_{act}^{lim}$ is the threshold used to penalize the control action.

12. The iterative tuning method of claim 10, wherein the set of time delays includes at least one of a sampling rate of the controller and a communication delay via a controller area network (CAN) on which the controller is connected.

13. The iterative tuning method of claim 12, wherein the set of time delays further includes at least one of controller software scheduling delays and vehicle actuator actuation delays.

14. The iterative tuning method of claim 13, wherein the set of time delays further includes at least one of a friction delay and an inertia delay for a moving component of the feedback based system.

15. The iterative tuning method of claim 10, wherein the feedback based system is controlled by the controller using a proportional-integral (PI) or proportional-integral-derivative (PID) feedback scheme, and wherein the set of gains includes at least one of a proportional gain and an integral gain.

16. The iterative tuning method of claim 10, wherein the feedback based system further includes a torque of the electric motor of the vehicle.

17. The iterative tuning method of claim 10, wherein the feedback based system further includes an idle speed of an internal combustion engine of the vehicle.

18. The iterative tuning method of claim 10, wherein the feedback based system further includes a position of an active suspension system of the vehicle.

\* \* \* \* \*